United States Patent
Davis

(10) Patent No.: US 7,772,963 B2
(45) Date of Patent: Aug. 10, 2010

(54) SYSTEM AND METHOD FOR SYNCHRONIZATION OF DATA STREAMS

(75) Inventor: Michael L Davis, Amherst, NY (US)

(73) Assignee: Honeywell International Inc., Morristown, NJ (US)

( * ) Notice: Subject to any disclaimer, the term of this patent is extended or adjusted under 35 U.S.C. 154(b) by 760 days.

(21) Appl. No.: 11/255,406

(22) Filed: Oct. 20, 2005

(65) Prior Publication Data

US 2007/0090924 A1    Apr. 26, 2007

(51) Int. Cl.
*H04Q 5/22* (2006.01)

(52) U.S. Cl. .................... 340/10.4; 340/10.3; 340/10.2; 340/10.5; 340/572.1; 340/572.2

(58) Field of Classification Search ................ 340/10.4, 340/10.1, 10.3, 572.1, 572.2, 10.2
See application file for complete search history.

(56) References Cited

U.S. PATENT DOCUMENTS

| | | | |
|---|---|---|---|
| 4,546,241 A | 10/1985 | Walton | |
| 4,730,188 A | 3/1988 | Milheiser | |
| 5,041,826 A | 8/1991 | Milheiser | |
| 5,166,676 A | 11/1992 | Milheiser | |
| 5,818,348 A * | 10/1998 | Walczak et al. | 340/10.3 |
| 5,887,176 A * | 3/1999 | Griffith et al. | 713/320 |
| 6,538,560 B1 * | 3/2003 | Stobbe et al. | 340/5.72 |
| 6,661,336 B1 * | 12/2003 | Atkins et al. | 340/10.2 |

* cited by examiner

*Primary Examiner*—Vernal U Brown
(74) *Attorney, Agent, or Firm*—Barkume & Associates, P.C.

(57) ABSTRACT

A method of and system for acquiring data by a data reader from a transponder in which the data from the transponder does not require a preamble to denote the beginning of the data sequence. A radio frequency signal is continuously transmitted by the card reader to generate a radio frequency field. Once a transponder enters the RF field, then response data is generated by the transponder and received by the card reader. The transmission of the radio frequency signal by the card reader is temporarily stopped on detection of the response data from the transponder, and then reinitiated by the card reader after it stops receiving response data from the transponder in order to regenerate the radio frequency field. The response data subsequently received from the transponder in the radio frequency field is then stored in memory.

15 Claims, 2 Drawing Sheets

SYSTEM AND METHOD FOR SYNCHRONIZATION OF DATA STREAMS

TECHNICAL FIELD

This invention relates to the synchronization of data in RF data acquisition systems such as RF proximity access card systems, and in particular to a data acquisition methodology that eliminates the need for using a preamble or other types of framing bits to denote the beginning of a data sequence from a transponder or other data transmitting device.

BACKGROUND ART

A multitude of devices exist that continuously transmit data that is repeated over and over. These devices are typically used for telemetry applications using RFID as the transmission medium. In decoding this continuous data stream, a common problem is how to identify the beginning of a continuously repeating data stream.

For example, access control systems typically implement an RFID transponder embedded in a card referred to as an access control card. A card reader is located near an access point in a premises, such as by a door in a building. When the holder of the card presents the card towards the reader, an RF field generated by the reader is used by the transponder in the card to generate response data that is encoded with a unique card identifier. The card ID is used to modulate a return RF signal that is received, demodulated and decoded by the card reader circuitry and then used to lookup a database (centrally located), for example, and determine if that user is authorized to enter the door under control. If authorized by the system, the access control reader will allow opening of the door (such as by electronically unlocking the door) so the user can enter. If that user is unauthorized, then the door will not be opened for the user. These proximity access control systems are well known in the art and need not be described in further detail herein.

The nature of this type of system is that the response data generated by the transponder in the access control card is continuously sent, since it is a function of the RF field generated by the card reader device. As such, when the transponder enters the area it will continuously send the response data, and the card reader will not be able to determine the beginning and end of a data sequence. This problem has been addressed in the past by using known preamble sequences in the card, so that the card reader will look for the predetermined sequence in order to determine the proper data that follows the preamble. Other mechanisms such as framing bits or sequences may also be used in the prior art to determine appropriate synchronization.

It is desired, however, to be able to determine the beginning of a data stream in this type of system that does not rely on the use of unique data patterns such as a preamble and the like.

DISCLOSURE OF THE INVENTION

The present invention is a method of and system for acquiring data by a data reader from a transponder, such as in an RF proximity access card system, in which the data from the transponder does not require a preamble, framing bits or the like to denote the beginning of the data sequence. A radio frequency signal is continuously transmitted by the card reader to generate a radio frequency field. Once a transponder (such as one embedded in an access control card) enters the RF field, then response data is generated by the transponder and received by the card reader. The transmission of the radio frequency signal by the card reader is temporarily stopped on detection of the response data from the transponder, and then reinitiated by the card reader after it stops receiving response data from the transponder in order to regenerate the radio frequency field. The response data subsequently received from the transponder in the radio frequency field is then stored in memory. Since termination of the RF field will cause the transponder to transmit the response data sequence from the beginning once the RF field is reinitiated, the response data thusly received is known to have started from the beginning of the sequence, eliminating the need for a preamble or other type of framing bits.

BEST MODE FOR CARRYING OUT THE INVENTION

Figure 1:
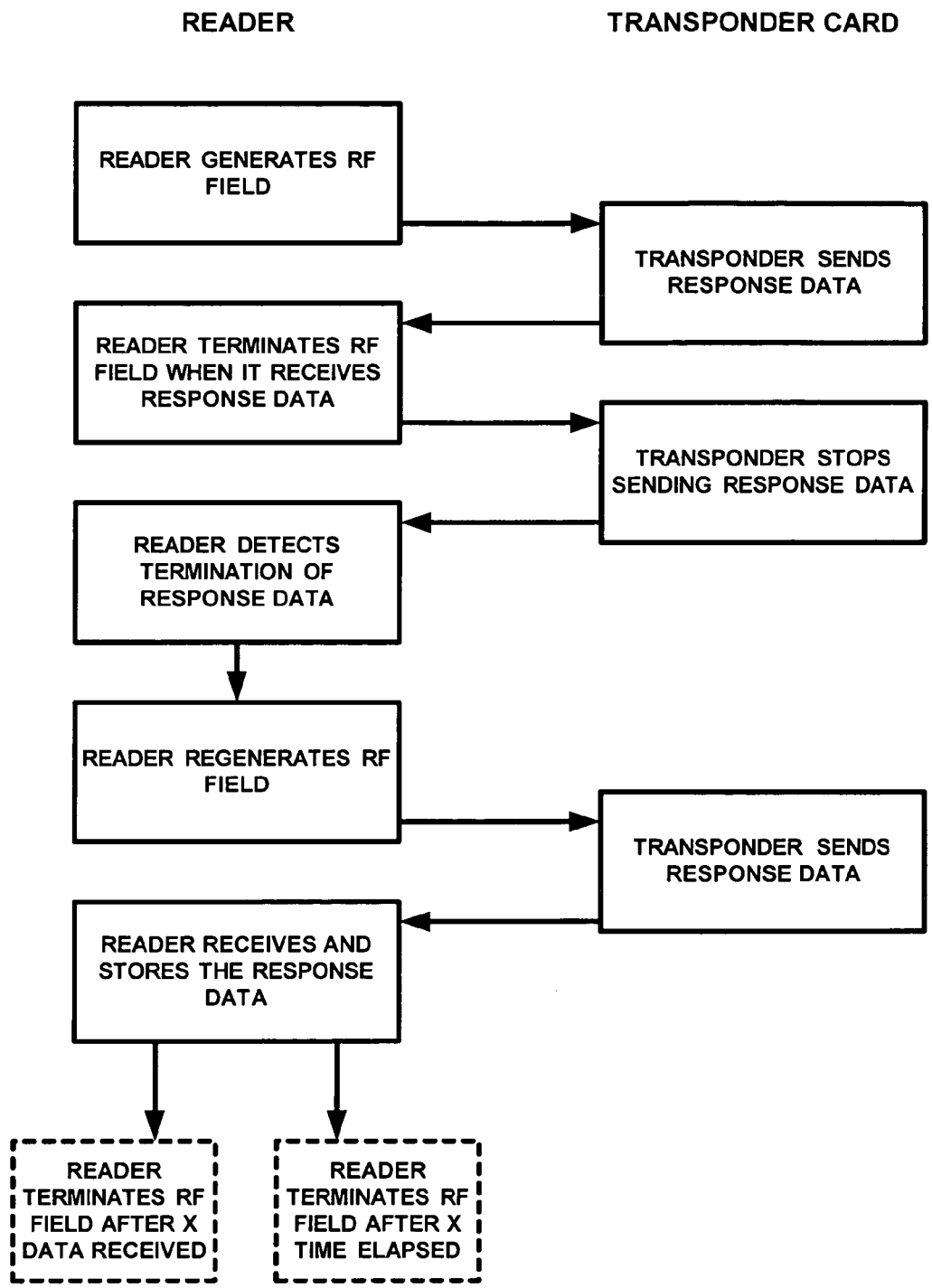
FIG. 1 is a flowchart of the operation of the present invention.
Figure 2:
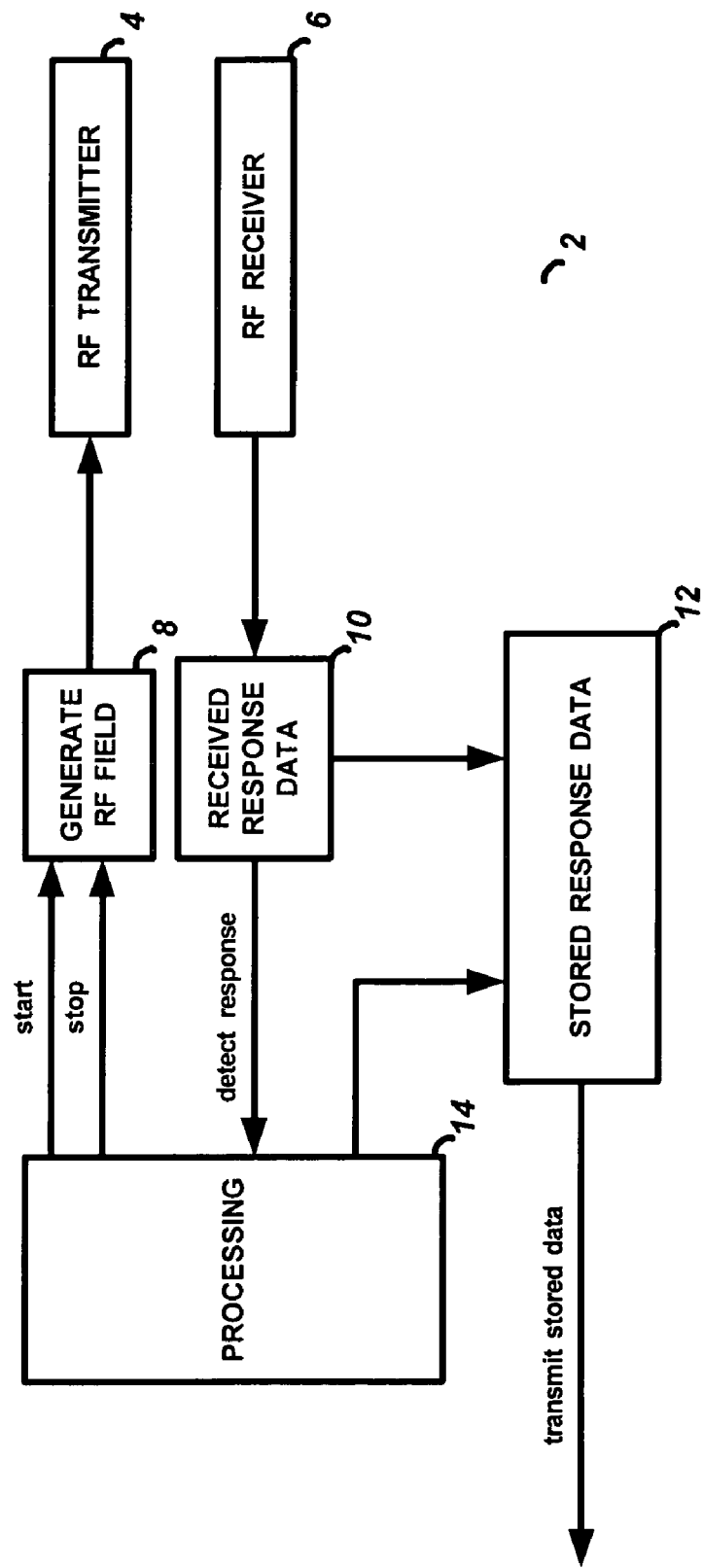
FIG. 2 is a functional block diagram of the present invention.

With respect to FIG. 1 and FIG. 2, illustrated is a system that uses an access card reader, typically located near an access point such as a door in a premises. An RF transmitter 4 is caused to continuously generate and transmit an RF signal into the surrounding area, thus generating an RF field. A user enters the area and presents an access control card having a transponder embedded thereon. As well known in the art, the transponder will receive the RF signals generated by the RF transmitter and begin to transit response data that will have unique identification information encoded therein, as well known in the art. In accordance with the preferred embodiment of this invention, the response data will not need to have any type of preamble or other type of unique indicia in order to denote the beginning and/or end of the data sequence to the card reader. Instead, the present invention operates as follows.

Processing circuitry 14 on the card reader, which controls the various functions typically performed by the card reader as known in the art, is also adapted to detect that that response data is being received at buffer 10. Once the processing circuitry detects the receipt of response data, it will terminate the generation of the RF field such as by causing the RF transmitter to cease transmitting the RF signal. This will in turn cause the transponder in the access card to stop sending the response data. The processing circuitry will then detect that the response data is no longer being received at the buffer 10, and as a result the processing circuitry will then reinitiate transmission of the RF signal by the RF transmitter 4. As the transponder in the access control card begins to receive the RF signals once again, it will also start to transmit response data back to the RF receiver accordingly.

The transponder in the access control card will begin transmission of the reinitiated sequence from the beginning of the data sequence. That is, the act of ceasing transmission of the RF signals back to the access card reader 2 will act as a reset function, and the next transmission will necessarily begin from the beginning of the data sequence stored in the control card. As such, the new response data sequence (i.e. the sequence received by the buffer 10 after transmission by the RF transmitter has terminated and then reinitiated) will necessarily start from the beginning, and the processing circuitry 14 will cause that response data to be stored in the stored response data memory buffer 12.

With the start position of the received response data now determined by this unique termination/reinitiation sequence method of the present invention, various techniques may be used to ascertain the end of the data stream. For example, the system may be configured to use a predetermined number of bits in a data response, such as 16. Thus, the processing circuitry will count 16 bits from the known beginning of the sequence in order to ascertain the entire response data word. Similarly, the processing circuitry 14 may use a time basis, and determine that the entire data word has been captured after a predetermined time has been counted from the receipt of the first bit after reinitiation of the data transmission.

Once the all of the response data has been stored in the buffer 12, it may be processed as known in the art, such as by transmitting it on a wired (or wireless) bus to a master controller remotely located, or analyzing the data locally by the processing circuitry, etc.

What is claimed is:

1. A method of acquiring data by a data reader in an access control system comprising the steps of:
    transmitting a radio frequency signal to generate a radio frequency field;
    receiving, from a transponder in the radio frequency field, response data encoded with identification information;
    terminating transmission of the radio frequency signal on detecting that response data is being received;
    detecting that the response data is no longer being received;
    in response to detecting that the response data is no longer being received, then reinitiating transmission of the same radio frequency signal to regenerate the same radio frequency field;
    receiving subsequent response data from the transponder in the radio frequency field; and
    storing the received subsequent response data in memory.

2. The method of claim 1 further comprising the step of terminating the regeneration of the radio frequency field after a predetermined amount of response data is received.

3. The method of claim 1 further comprising the step of terminating the regeneration of the radio frequency field after a predetermined amount of time has elapsed.

4. The method of claim 1 further comprising the steps of:
    retrieving the received subsequent response data from memory; and
    transmitting the retrieved subsequent response data on an associated data bus.

5. A data reading device comprising:
    a radio frequency signal transmitter;
    a radio frequency signal receiver; and
    processing circuitry interconnected with the radio frequency signal transmitter and the radio frequency signal receiver, said processing circuitry adapted to:
        cause the radio frequency signal transmitter to transmit a radio frequency signal to generate a radio frequency field;
        detect that response data is being received by the radio frequency receiver from a transponder in the radio frequency field, said response data encoded with identification information;
        terminate transmission of the radio frequency signal on detecting that response data is being received;
        detect that the response data is no longer being received;
        in response to detecting that the response data is no longer being received, reinitiate transmission of the same radio frequency signal to regenerate the same radio frequency field;
        detect that the radio frequency receiver has received subsequent response data from the transponder in the radio frequency field; and
        store the received subsequent response data in an associated memory.

6. The data reading device of claim 5, wherein said processing circuitry is further adapted to terminate the regeneration of the radio frequency field after a predetermined amount of response data is received.

7. The data reading device of claim 5, wherein said processing circuitry is further adapted to terminate the regeneration of the radio frequency field after a predetermined amount of time has elapsed.

8. The data reading device of claim 5, wherein said processing circuitry is further adapted to
    retrieve the received subsequent response data from memory; and
    transmit the retrieved subsequent response data on an associated data bus.

9. An RF proximity access system comprising:
    a) a data reading device comprising:
        a radio frequency signal transmitter;
        a radio frequency signal receiver; and
        processing circuitry interconnected with the radio frequency signal transmitter and the radio frequency signal receiver, said processing circuitry adapted to:
            cause the radio frequency signal transmitter to transmit a radio frequency signal to generate a radio frequency field;
            detect that response data is being received by the radio frequency receiver from a transponder in the radio frequency field, said response data encoded with identification information;
            terminate transmission of the radio frequency signal on detecting that response data is being received ;
            detect that the response data is no longer being received;
            in response to detecting that the response data is no longer being received, reinitiate transmission of the same radio frequency signal to regenerate the same radio frequency field;
            detect that the radio frequency receiver has received subsequent response data from the transponder in the radio frequency field; and
            store the received subsequent response data in an associated memory; and
    b) a plurality of access cards, each of said access cards comprising a transponder comprising:
        means for receiving a radio frequency signal transmitted from the data reading device; and
        means for transmitting response data to the data reading device uniquely identifying the access card amongst the plurality of access cards.

10. The RF proximity access system of claim 9, wherein said processing circuitry is further adapted to terminate the regeneration of the radio frequency field after a predetermined amount of response data is received.

11. The RF proximity access system of claim 9, wherein said processing circuitry is further adapted to terminate the regeneration of the radio frequency field after a predetermined amount of time has elapsed.

12. The RF proximity access system of claim 9, wherein said processing circuitry is further adapted to retrieve the received subsequent response data from memory; and transmit the retrieved subsequent response data on an associated data bus.

13. The method of claim 1 wherein the response data received from a transponder in the radio frequency field is encoded without internal sync information.

14. The data reading device of claim 5, wherein the response data received from a transponder in the radio frequency field is encoded without internal sync information.

15. The RF proximity access system wherein the response data received from a transponder in the radio frequency field is encoded without internal sync information.

* * * * *